(12) United States Patent
Hägglund et al.

(10) Patent No.: US 8,209,087 B2
(45) Date of Patent: Jun. 26, 2012

(54) SUSPENSION DEVICE AND METHOD FOR USE WITH A VEHICLE

(75) Inventors: Henrik Hägglund, Björna (SE); Assar Christensen, Örnsköldsvik (SE)

(73) Assignee: BAE Systems Hagglunds Aktiebolag (SE)

( * ) Notice: Subject to any disclaimer, the term of this patent is extended or adjusted under 35 U.S.C. 154(b) by 676 days.

(21) Appl. No.: 12/291,355

(22) Filed: Nov. 6, 2008

(65) Prior Publication Data

US 2009/0138157 A1 May 28, 2009

(30) Foreign Application Priority Data

Nov. 9, 2007 (SE) .................................... 0702481-3

(51) Int. Cl.
*B60G 17/018* (2006.01)
(52) U.S. Cl. ............ 701/37; 280/124.157; 280/124.158; 280/124.159; 280/5.506
(58) Field of Classification Search ........... 280/124.157, 280/124.158, 124.159, 5.506, 5.507, 5.508; 701/36, 37, 38
See application file for complete search history.

(56) References Cited

U.S. PATENT DOCUMENTS

| | | | | |
|---|---|---|---|---|
| 4,159,106 A | | 6/1979 | Nyman | |
| 4,865,347 A | * | 9/1989 | Fukushima et al. | 280/5.508 |
| 4,888,696 A | * | 12/1989 | Akatsu et al. | 701/38 |
| 4,975,849 A | * | 12/1990 | Ema | 701/37 |
| 5,016,907 A | * | 5/1991 | Akatsu et al. | 280/5.508 |
| 5,042,834 A | * | 8/1991 | Yonekawa et al. | 280/5.514 |
| 5,078,421 A | * | 1/1992 | Kokubo et al. | 280/5.5 |
| 5,080,392 A | * | 1/1992 | Bazergui | 188/266.4 |
| 5,144,558 A | * | 9/1992 | Fukushima et al. | 701/38 |
| 5,193,845 A | * | 3/1993 | Yokote et al. | 280/5.503 |
| 6,290,245 B1 | * | 9/2001 | Ishikawa et al. | 280/124.16 |
| 2003/0085042 A1 | | 5/2003 | Rogala | |
| 2005/0184475 A1 | | 8/2005 | Hamm | |

FOREIGN PATENT DOCUMENTS

| | | |
|---|---|---|
| DE | 19833854 | 2/1999 |
| DE | 19748243 | 5/1999 |
| DE | 102005040911 | 1/2007 |
| EP | 0425885 | 5/1991 |
| EP | 0 607 516 A2 | 7/1994 |
| EP | 1757473 | 2/2007 |
| EP | 1759894 | 3/2007 |
| WO | WO-99/64262 A1 | 12/1999 |

OTHER PUBLICATIONS

European Search Report, EP 08168261, dated Feb. 27, 2009.

* cited by examiner

*Primary Examiner* — Toan To
(74) *Attorney, Agent, or Firm* — Lerner, David, Littenberg, Krumholz & Mentlik, LLP

(57) ABSTRACT

A suspension device has in- and out-configurations for use with a vehicle, including means for damping and/or spring action, the damping and/or spring action being controllable, wherein the controllability of the damping and/or spring action includes a locked or substantially locked state in the out-configuration. A method of using the suspension device with a vehicle is also provided.

19 Claims, 7 Drawing Sheets

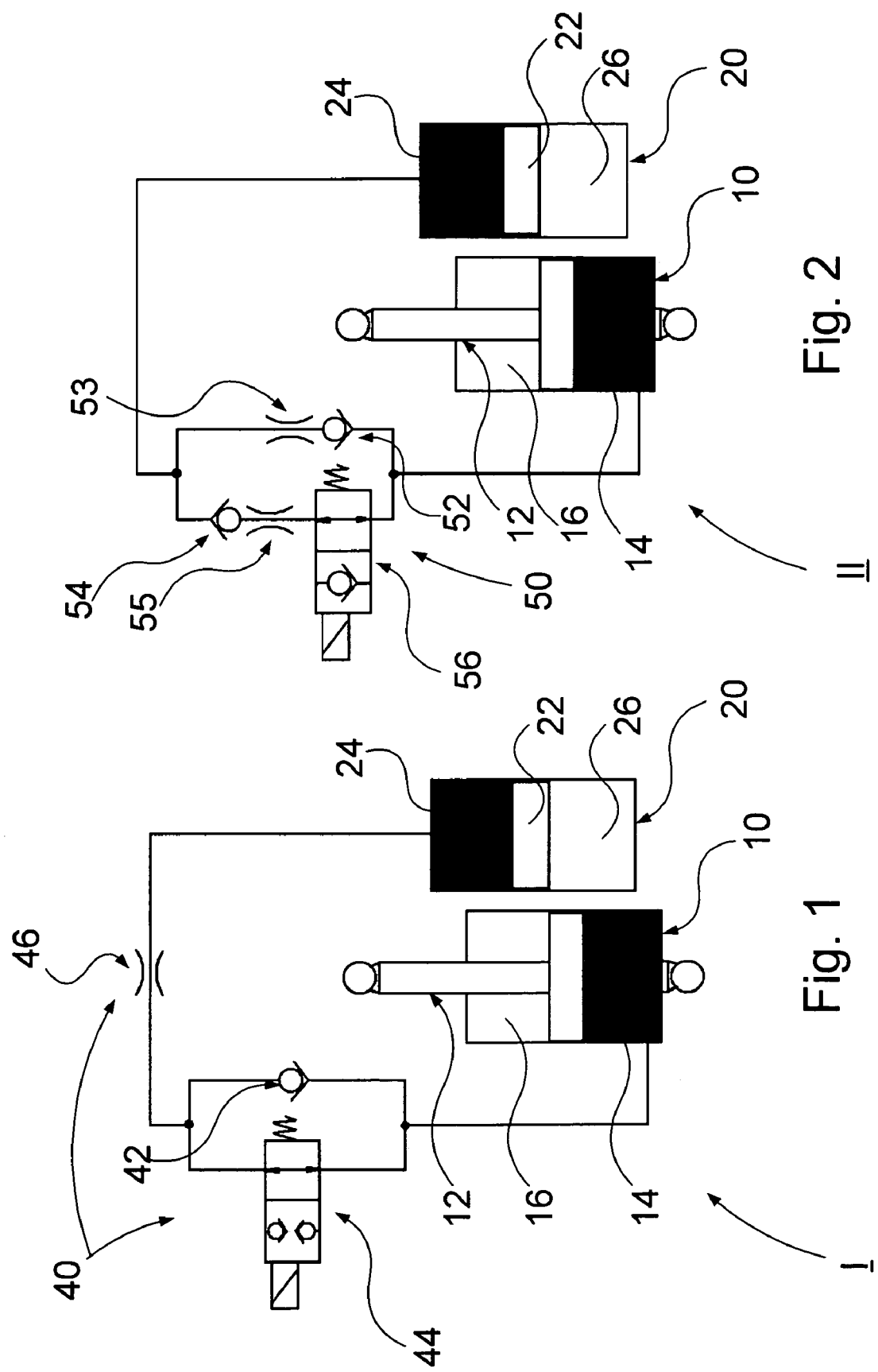

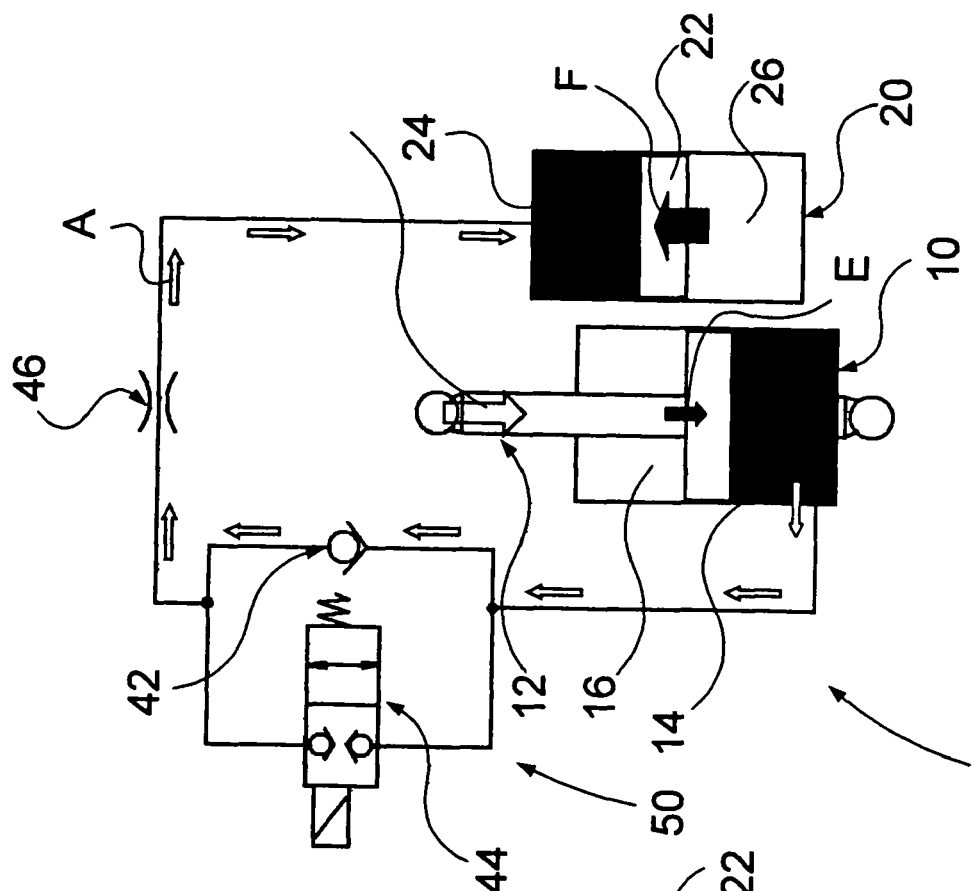
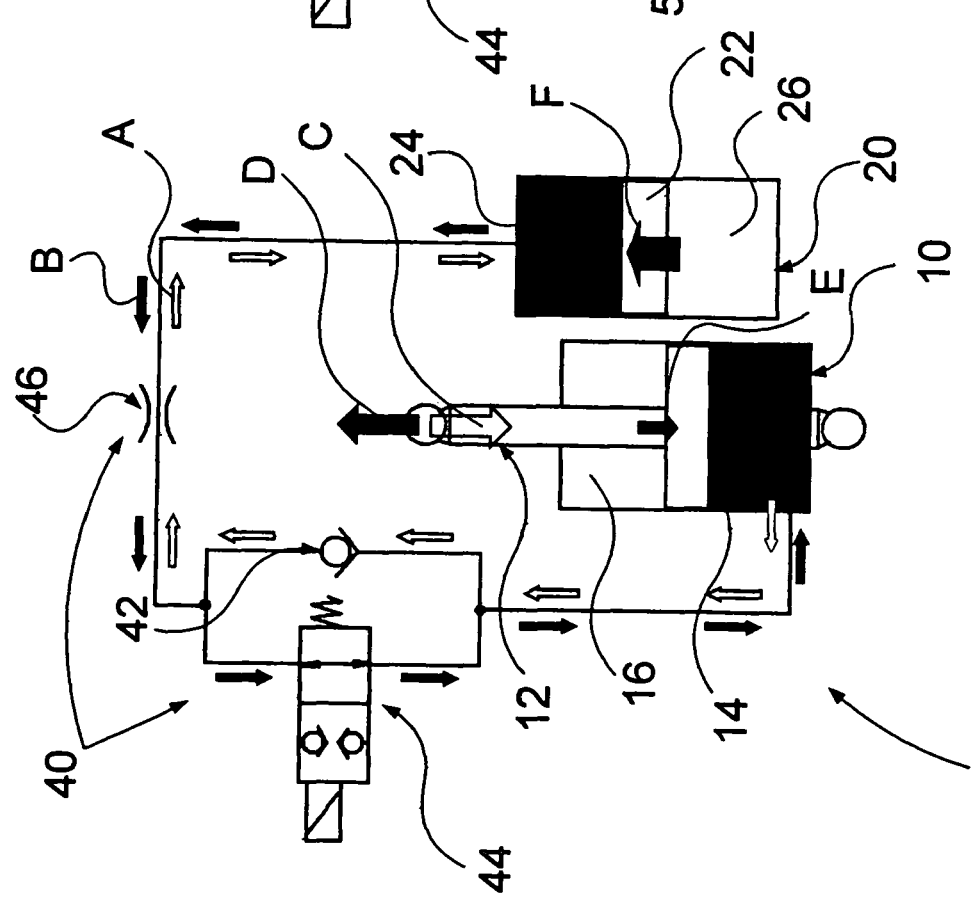

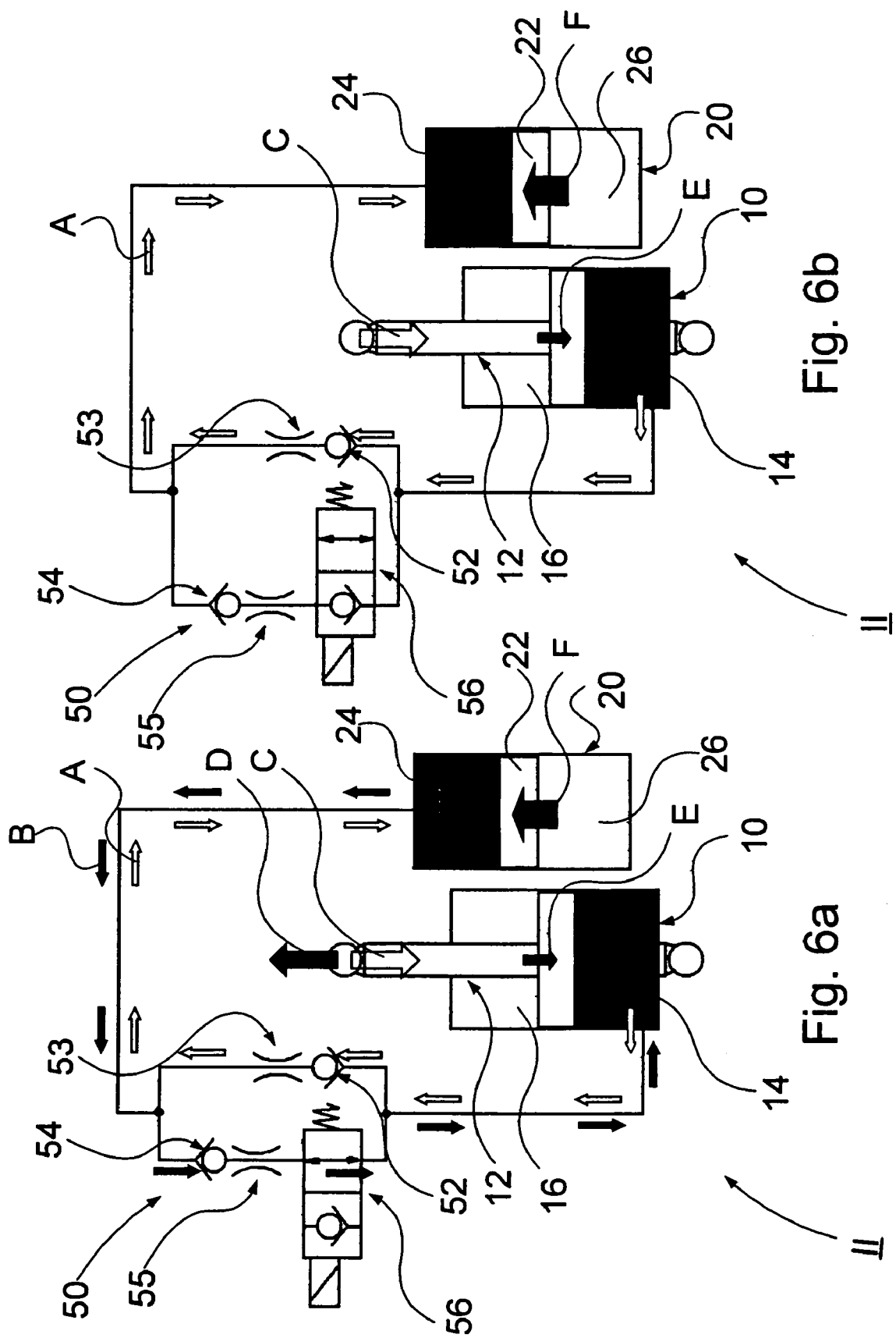

SUSPENSION DEVICE AND METHOD FOR USE WITH A VEHICLE

CROSS-REFERENCE TO RELATED APPLICATIONS

This application claims the benefit of the filing date of Swedish Patent Application No. 0702481-3 filed Nov. 9, 2007, the disclosure of which is hereby incorporated herein by reference.

BACKGROUND OF THE INVENTION

The present invention relates to a suspension device comprising in- and an out-configurations, respectively, for a vehicle. The present invention also relates to a method for providing a damping and/or springing action with in- and out-configurations of a vehicle. The present invention further relates to a vehicle. The present invention also relates to a computer programme and a computer programme product for performing the method.

Road holding, running characteristics and comfort are important parameters of vehicles such as cars, military vehicles, trucks and the like. In order to improve road holding, running characteristics and comfort, vehicles are equipped with suspensions systems, which is arranged to protect the vehicle, passengers and load from damage and wear. A suspension system comprises spring members for supporting the vehicle at the correct level and absorbing impacts such that irregularities on the ground do not propagate to the vehicle body, and damp members for putting out vibrations, roll and rocking of the vehicle body.

During cornering, for example, the vehicle rotates about its own roll axes, i.e. the vehicle tends to incline. By so-called hydro-pneumatic springs, the force of the springs level out during spring expansion, as opposed to a helical spring, which has a linear spring curve in which the force approaches zero by spring expansion. The high pre-load of hydro-pneumatic springs results in that in the spring expansion position there still is a relatively large spring force of the hydro-pneumatic spring, which results in the fact that the vehicle will incline to a greater extent during, for example, cornering when roll occurs.

By using so-called stabilizers, i.e. a suspension attachment in the form of a bar connecting opposite wheels of the vehicle, a reduced inclination without stiffening of the vertical suspension is conceivable, facilitating improved running characteristics with a relatively good comfort. A problem with the use of a stabilizer is that it transfers the power of a bumping wheel to the opposite wheel, wherein shaking from side to side occurs, which increases with the diameter and stiffness of the stabilizer, and, where applicable, may lead to lifting of the inner wheels by heavy cornering. Due to the high pre-load of hydro-pneumatic springs, strong stabilizers are required, which results in them having to be excluded in cross-country vehicles in certain cases since the traversability in terrain is heavily reduced.

Lately more active suspension systems have been developed which adapt to the present state of the vehicle. A so-called semi-active suspension system is arranged to regulate the damping while the spring has a non-variable spring constant, or alternatively is arranged to regulate the spring constant where the damping is kept constant. An active spring system is arranged to regulate both damping and spring action. Stabilizers may be replaced by semi-active/active systems in which the spring is actively controllable. A problem with such semi-active/active suspension systems is that variable damping action by compression leads to, when the damping action is increased, the possibility of the wheel starting to bounce when the roadway is uneven, such that the vehicle loses its grip.

U.S. Pat. No. 4,153,237 discloses a hydro-pneumatic damping device comprising a damper with a manually adjustable low-speed damping on the return and compression, and manually adjustable high-speed damping on return. The suspension device does not have an active damp valve.

U.S. Pat. No. 4,720,085 discloses a damping device with both adjustable compression and return, in which adjustment of compression and return is done by means of an electric motor.

U.S. Pat. No. 4,159,106 discloses a damping device with a damper having a pressure dependent return damping action, in which regulation of the damper is done mechanically automatically. The damping of the damping device is not controllable.

SUMMARY OF THE INVENTION

An object of the present invention is to provide a spring device for a vehicle which improves the running characteristics of the vehicle by, for example, cornering, braking and accelerating without impairing comfort and traversability.

An additional object of the present invention is to provide a method for providing a spring/damping action of a vehicle, which improves the running characteristics of the vehicle by, for example, cornering, braking and accelerating without impairing comfort and traversability.

These and other objects, apparent from the following description, are achieved by a suspension device, a method, a vehicle, a computer programme and computer programme product.

According to the present invention, the objects are achieved by means of a suspension device comprising in- and out-configurations, respectively, for a vehicle comprising means for damping and/or spring action, the damping and/or spring action being controllable, wherein the controllability of the damping and/or spring action comprises a locked or substantially locked state in the out-configuration. This results in the centre of gravity of the vehicle being lowered by heeling of the vehicle by, for example, cornering or driving with heavy inclination of the vehicle, in that the vehicle is lowered, whereby the risk of tipping is reduced. The angle of rotation about the roll centre of the vehicle is reduced due to lowered centre of gravity and due to the fact that out-configuration of, for example, the inner spring leg during cornering does not assist in rotating the vehicle since it is locked or substantially locked. As such, comfort and grip is maintained.

According to an exemplary embodiment, the suspension device is semi-active in such a way that the damping action is arranged to occupy a locked or substantially locked state in the out-configuration. It is easier to control the damping action compared to controlling the spring action. It is easier to construct control of damping action and consequently cheaper. Control of damping action also results in shorter response time and requires less power.

According to another exemplary embodiment of the suspension device, the damping is hydraulic. Hereby, the spring force in the out-configuration of, for example, the inner spring leg during cornering increases only marginally whereby comfort and grip are maintained. Prolonged anti-roll is dealt with due to the locking of the out-configuration of a hydro-pneumatic system, since no oil is allowed to flow through the throttle (damper) by the out-configuration, while damping action of the in-configuration, i.e. the spring compression, is maintained, which results in the vehicle still performing a spring action when it runs on irregularities. Due to the out-configuration being locked, no time-dependent throttling resulting in increased inclination occurs during prolonged cornering or inclination of the vehicle.

According to another exemplary embodiment of the suspension device, a valve configuration is present comprising a valve for control in the out-configuration. This results in a reliable way of providing the control in the out-configuration.

According to another exemplary embodiment of the suspension device, the valve configuration comprises a separate valve in the in-configuration.

According to another exemplary embodiment of the suspension device, the valve configuration comprises a throttle valve arranged in series with the valve for control. This facilitates use of a controllable valve which withstands high pressures and flows, which is advantageous in heavy vehicles such as, for example, cross-country vehicles.

According to another exemplary embodiment, the suspension device comprises means for sensing heeling of a vehicle during cornering, driving on uneven terrain, etc., wherein the damping and/or spring action is arranged to be locked or substantially locked in the out-configuration, based on the heeling. In such a way, the out-configuration is automatically controlled during driving.

According to another exemplary embodiment of the suspension device, the sensing means comprises a member for sensing lateral acceleration. This is one way of sensing cornering for activation for locking of the out-configuration. According to another exemplary embodiment of the suspension device, the sensing means comprises a member for sensing inclination of the vehicle relative to the horizontal plane. By sensing inclination of the vehicle, activation for locking of the out-configuration may also occur when the vehicle, for example, is driving on a slant but not in a curve.

According to the present invention, the objects are also achieved by means of a method during damping and/or spring action with in- and out-configurations of a vehicle comprising the step of controlling the damping and/or spring action, and the step of locking or substantially locking the damping and/or spring action in the out-configuration. This results in the centre of gravity of position of the vehicle being lowered by heeling of the vehicle during, for example, cornering or driving with heavy inclination of the vehicle in that the body of the vehicle is lowered, wherein the risk of tipping is reduced. The angle of rotation about the roll centre of the vehicle is reduced due to lowered centre of gravity and due to the out-configuration of, for example, the inner spring leg during cornering not assisting in rotating the vehicle since it is locked or substantially locked. In such a way, comfort and grip is maintained.

According to another exemplary embodiment, the method comprises the step of sensing heeling of vehicle during cornering, driving on uneven terrain, etc., in order to, based upon the heeling, lock or substantially lock the damping and/or spring action in the out-configuration. In such a way, the out-configuration is automatically controlled during driving.

According to another exemplary embodiment, the method comprises the step of sensing lateral acceleration in order to, based upon the lateral acceleration, lock or substantially lock the damping and/or spring action in the out-configuration. This is one way of sensing cornering for activation for locking of the out-configuration.

According to another exemplary embodiment, the method comprises the step of sensing inclination of the vehicle in order to, based upon the position, lock or substantially lock the damping and/or spring action in the out-configuration. By sensing inclination of the vehicle, activation for locking of the out-configuration may occur also when the vehicle, for example, is driving on a slant but not in a corner.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which:

FIG. 1 schematically shows a suspension device according to a first embodiment of the present invention;

FIG. 2 schematically shows a suspension device according to a second embodiment of the present invention;

FIGS. 5a-b schematically show the suspension device according to the first embodiment during compression and expansion, and during heeling restrain respectively;

FIGS. 6a-b schematically show the suspension device according to the second embodiment during compression and expansion, and during heeling restrain respectively;

DETAILED DESCRIPTION

Figure 3:
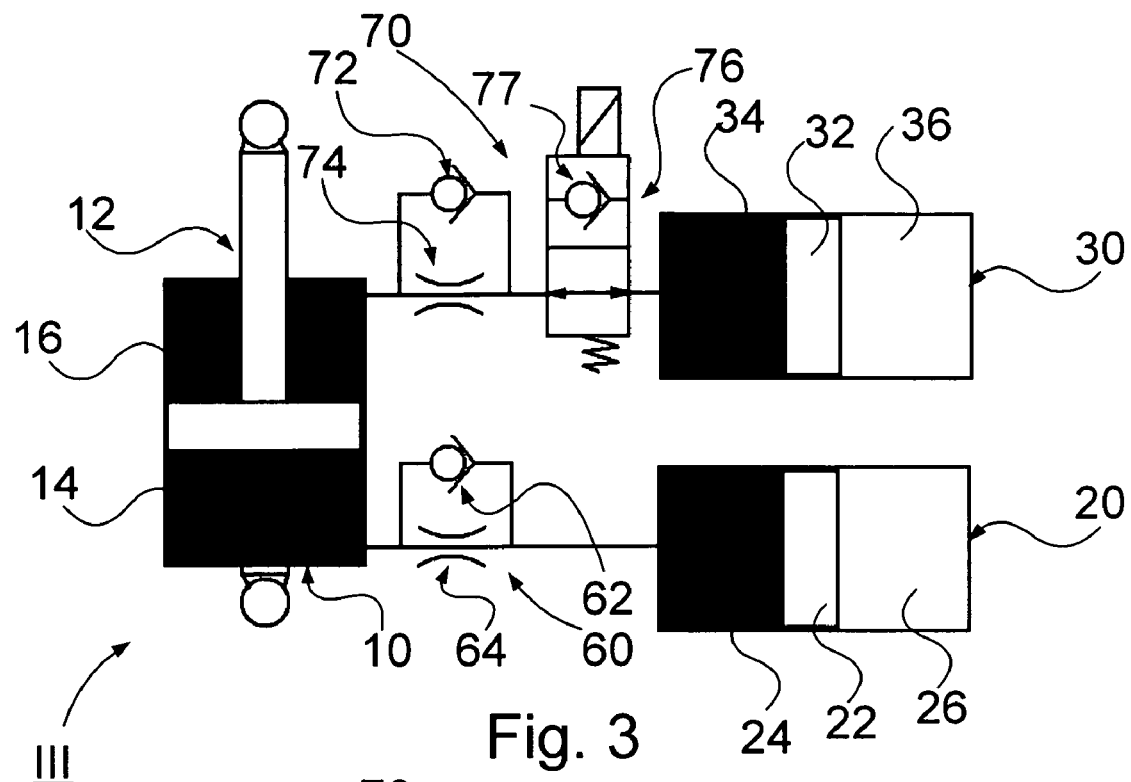
FIG. 3 schematically shows a suspension device according to a third embodiment of the present invention.

FIG. 1 schematically shows a suspension device I according to a first embodiment of the present invention. The suspension device I comprises in- and out-configurations, respectively. The suspension device I comprises a first space 10 and a second space 20 separated by means of a valve configuration 40, which is in fluid communication with the first and the second spaces, the valve configuration 40 being arranged to control the flow of the fluid between the first and second spaces.

The suspension device I further comprises a piston stem 12 glidably arranged in the first space. The piston stem 12 is intended to be connected to a wheel of the vehicle via a linkage. The piston stem 12 is arranged in the first space 10 in such a way that it is divided into a first cavity 14 and a second cavity 16, the first cavity 14 being in fluid communication with the valve configuration 40 and containing a first fluid, preferably oil, and the second cavity containing a second fluid in the form of a gaseous medium, e.g. nitrogen, having a relatively low pressure.

The piston stem 12 is movable in the first space in a direction of compression, the oil being arranged to be pressed by means of the piston stem 12 from the first cavity 14 towards the valve configuration 40, and in a direction of expansion, in which the oil is supplied to the first cavity 14. Compression means inward damping/inward spring action of the vehicle, and expansion means outward damping/outward spring action or return of the vehicle. The in-configuration comprises the direction of compression of the piston stem, i.e.

retraction of the piston stem, and out-configuration comprises the direction of expansion of the piston stem, i.e. extension of the piston stem.

The second space 20 is divided into a third cavity 24 and a fourth cavity 26 by means of a piston 22, which is glidably arranged in the second space 20. The third cavity 24 is in fluid communication with the valve configuration 40 and contains the first fluid, e.g. oil, and the fourth cavity 26 contains a fluid in the form of a compressible gaseous medium, e.g. nitrogen, having a relatively high pressure. The second space 20 thus constitutes a hydro-pneumatic spring accumulator with a high pressure.

The valve configuration 40 comprises a first valve member 42 in the form of a non-return valve 42 which is arranged to allow oil through the first cavity 14 during compression, i.e. during movement of the piston stem in the direction of compression, i.e. during retraction of the piston stem 12. The non-return valve 42 is further arranged to not allow oil through from the third cavity 24 during expansion, i.e. during piston movement in the direction of expansion, i.e. during extension of the piston stem 12.

The valve configuration 40 further comprises a second valve member 44 in the form of a controllable valve member 44. The controllable valve member 44 is arranged parallel to the non-return valve 42. The controllable valve member 44 is controllably arranged between an open position in which the first fluid, i.e. oil is allowed to pass and a closed, or locked, position in which the first fluid is not allowed to pass. Consequently, in the closed position of the controllable valve member 44, the first fluid, i.e. oil, is allowed to pass the valve configuration 40 only during compression, where the fluid passes through the non-return valve 42. Expansion is consequently not possible in this position, i.e. the outward damping is locked.

The valve configuration further comprises a third valve member 46 in the form of a throttle valve 46 or a constriction. The throttle valve 46 is arranged in series with the first and second valve members. The throttle valve 46 constitutes a damping member, where the oil during compression and expansion is forced through the throttle valve 46, whereby a damping action of the piston movement and thus the vehicle is achieved.

FIG. 2 schematically shows a suspension device II according to a second embodiment of the present invention. The suspension device II comprises in- and out-configurations, respectively. The suspension device II for a vehicle comprises, as in the first embodiment, a first space 10 and a second space 20 separated by means of a valve configuration 50, which is in fluid communication with the first and second spaces, the valve configuration 50 being arranged to control the fluid between the first and second spaces.

The suspension device II according to the second embodiment differs from the suspension device I according to the first embodiment only by the design of the valve configuration.

The valve configuration 50 according to the second embodiment comprises a first pair of valves 52, 53, a second pair of valves 54, 55 and a controllable valve member 56. The first pair of valves is arranged parallel to the second pair of valves. The first pair of valves comprises a first non-return valve 52 and a first throttle valve 53 arranged in series. The second pair of valves comprises a second non-return valve 54 and a second throttle valve 55 arranged in series. The controllable valve member 56 is arranged in series with the second valve member 54, 55.

The first non-return valve 52 is arranged to allow oil through from the first cavity 14 during compression, i.e. during movement of the piston stem in the direction of compression, i.e. during retraction of the piston stem 12. The first non-return valve 52 is further arranged not to allow oil through the third cavity 24 during expansion, i.e. during movement of the piston in the direction of expansion, i.e. during extension of the piston stem 12.

The first throttle valve 53 constitutes a damping member, in which the oil during compression is forced through the first throttle valve 53, whereby a damping action of the piston movement and thus of the vehicle is achieved.

The second non-return valve 54 is arranged to allow oil through from the third cavity 24 during expansion, i.e. during movement of the piston stem in the direction of expansion, i.e. during extension of the piston stem 12. The second non-return valve 54 is further arranged not to allow oil through from the first cavity during compression, i.e. during movement of the piston in the direction of compression, i.e. during retraction of the piston stem 12.

The second throttle valve 55 constitutes a damping member, in which the oil during expansion is forced through the second throttle valve 55, whereby a damping action of the movement of the piston and thus of the vehicle is achieved.

The controllable valve member 56 is controllably arranged between an open position in which oil is allowed to pass and a closed, or locked, position in which oil is not allowed to pass. In the closed position of the controllable valve member 56, oil is thus allowed to pass through the valve configuration 50 only during compression, in which the fluid passes through the first non-return valve 52. Expansion is thus not possible in this position, i.e. the outward damping action is locked.

FIG. 3 schematically shows a suspension device III according to a third embodiment of the present invention. The suspension device III comprises in- and out-configurations, respectively. The suspension device III for a vehicle comprises a first space 10, a second space 20 and a third space 30. The first space 10 and the second space 20 are separated by means of a first valve configuration 60, which is in fluid communication with the first space 10 and second space 20, the first valve configuration 60 being arranged to control the fluid between the first space 10 and second space 20. The first space 10 and the third space 30 are separated by means of a second valve configuration 70, which is in fluid communication with the first space 10 and third space 30, the second valve configuration 70 being arranged to control the fluid between the first space 10 and the third space 30.

The suspension device III further comprises a piston stem 12 glidably arranged in the first space 10. The piston stem 12 is intended to be connected to a wheel of the vehicle via a linkage. The piston stem 12 is arranged in the first space 10 in such a way that it is divided into a first cavity 14 and a second cavity 16, the first cavity 14 being in fluid communication with the first valve configuration 60 and containing a first fluid, preferably oil, and the second cavity being in fluid communication with the second valve configuration 70 and containing a second fluid, preferably oil.

The piston stem 12 is movable in the first space 10 in a direction of compression, in which the oil is arranged to be pressed by means of the piston stem 12 from the first cavity 14 towards the first valve configuration 60, and in a direction of expansion, in which oil is supplied to the first cavity 14, and in which oil is arranged to be pressed from the second cavity 16 towards the second valve configuration 70. By compression is thus intended inward damping/inward spring action of the vehicle, i.e. retraction of the piston stem, and by expansion is intended outward damping/outward spring action or return of the vehicle, i.e. extension of the piston stem.

The second space 20 is divided into a third cavity 24 and a fourth cavity 26 by means of a second piston 22, which is glidably arranged in the second space 20. The third cavity 24 is in fluid communication with the first valve configuration 60 and contains the first fluid, e.g. oil, and the fourth cavity 26 contains a fluid in the form of a compressible gaseous medium, e.g. nitrogen, having a relatively high pressure. The second space 20 thus constitutes a hydro-pneumatic spring accumulator with high pressure.

The third space 30 is divided into a fifth cavity 34 and a sixth cavity 36 by means of a third piston 32, which is glidably arranged in the third space 30. The fifth cavity 34 is in fluid communication with the second valve configuration 70 and contains the second fluid, e.g. oil, and the sixth cavity 36 contains a fluid in the form of a compressible gaseous medium, e.g. nitrogen, having a relatively low-pressure.

The first valve configuration 60 according to the third embodiment of the suspension device III comprises a first valve member 62 in the form of a first non-return valve 62, and a second valve member 64 in the form of a first throttle valve 64, arranged parallel to the first non-return valve 62.

The first non-return valve 62 is arranged to allow oil through from the third cavity 24 during expansion, i.e. during movement of the piston stem 12 in the direction of expansion, i.e. during extension of the piston stem 12. The first non-return valve 62 is further arranged not to allow oil through from the first cavity 14 during compression, i.e. during movement of the piston stem 12 in the direction of compression, i.e. during retraction of the piston stem 12.

The first throttle valve 64 constitutes a damping member, in which the oil during compression is forced through the first throttle valve 64, whereby a damping action of the piston movement and thus of the vehicle is achieved.

The second valve configuration 70 according to the third embodiment comprises a third valve member 72 in the form of a second non-return valve 72, and a fourth valve member 74 in the form of a second throttle valve 74, arranged parallel to the second non-return valve 72. The second valve configuration 70 further comprises a controllable valve member 76 arranged in series with the third valve member 72 and fourth valve member 74.

The second non-return valve 72 is arranged to allow oil through from the fifth cavity 34 during compression, i.e. during movement of the piston stem 12 in the direction of compression, i.e. during retraction of the piston stem 12. The second non-return valve 72 is further arranged not to allow oil through from the second cavity 16 during expansion, i.e. during movement of the piston stem 12 in the direction of expansion, i.e. during extension of the piston stem 12.

The second throttle valve 74 comprises a damping member, in which the oil during expansion is forced through the second throttle valve 74, whereby a damping action of the piston movement and thus of the vehicle is achieved.

The controllable valve member 76 is controllably arranged between an open position, in which oil is allowed to pass, and a closed, or locked, position, in which oil is not allowed to pass. In the closed position of the controllable valve member 76, oil is thus only allowed to pass the first valve configuration 60 and the second valve configuration 70 during compression, when oil from the first cavity 14 passes through the first throttle valve 64, and oil from the fifth cavity 34 passes through a third non-return valve 77 of the controllable valve member 76. Expansion is thus not possible in this position, i.e. the outward damping action is locked.

Suspension devices I, II, and III according to the first, second and third embodiments, respectively, are each constituted by a hydro-pneumatic suspension device, in which damping action is hydraulic and spring action is hydro-pneumatic. The advantage of using hydro-pneumatic spring action is that the spring curve is progressive, which results in that the spring does not strike through as often as in a conventional linear spring. Since the spring contains gas, e.g. nitrogen or air, a light spring occupying little space and being capable of handling great forces is achieved. It is further easy to adjust/compensate for weight. The pre-load of the spring yields better comfort on an uneven road, e.g. reduced rocking.

Figure 4:
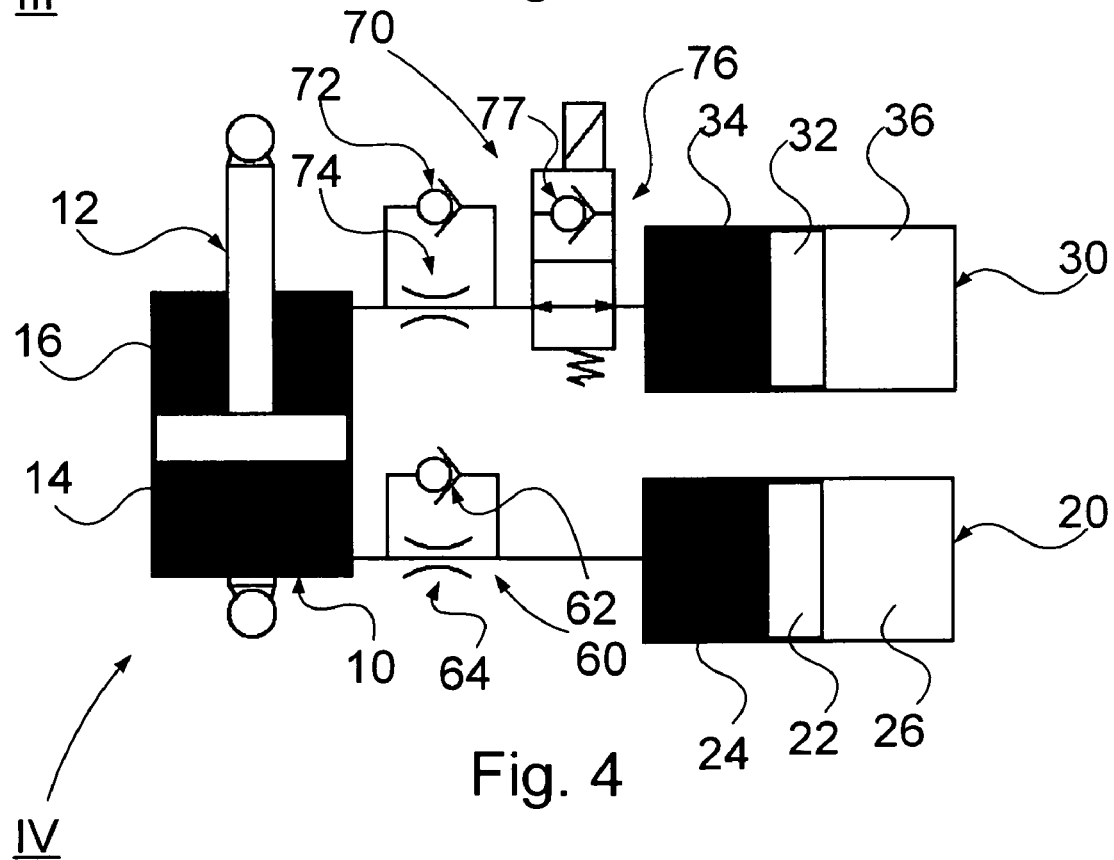
FIG. 4 schematically shows a suspension device according to a fourth embodiment of the present invention.

FIG. 4 schematically shows a suspension device IV according to a fourth embodiment of the present invention. The suspension device IV comprises in- and out-configurations, respectively. The suspension device IV according to the fourth embodiment differs from the suspension device III according to the third embodiment in that the fourth cavity 26 of the second space 20 contains a fluid in the form of a compressible gaseous medium, e.g. nitrogen, having a relatively low pressure.

The suspension device IV according to the fourth embodiment is formed as a damping cylinder, which may be combined with a separate spring member, which may be constituted by any suitable spring such as, for example, a helical spring, plate spring, torsion spring, air spring, etc. The separate spring member is arranged in such a way that inward and outward spring action is achieved during normal driving.

FIGS. 5-7 show the function of the suspension devices I-IV during normal driving of the vehicle and during heeling of the vehicle, respectively, for the different embodiments of the suspension devices I-IV according to the invention. In the Figures, the small white-filled arrows A illustrate the flow of the oil during compression/inward spring action, i.e. when the piston stem is retracted. The small black-filled arrows B illustrate the flow of the oil during expansion/outward spring action. The white-filled arrow C shows the direction of compression of the piston stem and the black arrow D shows the direction of expansion of the piston stem. The black arrow E shows a low pressure of the gaseous medium in the cavity 16 and the black arrow F shows high pressure of the gaseous medium in the cavity 26.

FIGS. 5a-b schematically show the suspension device I according to the first embodiment during compression and expansion, and during heeling restrain, respectively.

FIG. 5a shows the function of the suspension device I during normal inward and outward spring action, respectively, i.e. during driving in which no heavy curves or slopes occur, but only when normal irregularities on the roadway are present. In this position, the controllable valve member 44 is in its open position. During compression/inward spring action the piston stem 12 is retracted whereby oil flows from the first cavity 14 through the non-return valve 42 and further through the throttle valve 46, whereby damping action is achieved, to the third cavity 24 of the second space 20, in which second space spring action is achieved by means of the nitrogen gas of high pressure. During expansion/outward spring action the piston stem 12 is extended whereby oil flows from the third cavity 24 through the throttle valve 46, whereby damping is achieved, further through the controllable valve member 44, being in its open position, to the first cavity 14.

FIG. 5b shows the function of the suspension device I during heeling, i.e. during heavy cornering of the vehicle, during heavy inclination, etc., when the controllable valve member 44 is activated by means of a sensing means (not shown) arranged to sense the heeling. In this position, the controllable valve member 44 is in its closed position. During compression/inward spring action, the piston stem 12 is retracted whereby oil flows from the first cavity 14 through the non-return valve 42 and further through the throttle valve 46, whereby damping action is achieved, to the third cavity 24, in accordance with the function during normal inward spring action according to FIG. 5a. During expansion/outward spring action, oil is prevented from flowing through the controllable valve member 44, which is now set to its closed position, whereby the piston stem 12 is not extended, but remains in its normal position.

The suspension device I according to the first embodiment thus comprises a throttle valve 46 functioning as a damper damping the flow of oil in both directions, and a loop for inward spring action with non-return valve 42 and a loop for outward spring action with an active controllable valve member 44.

The suspension device I constitutes a single-acting spring leg with oil in the first cavity 14 and gas in the second cavity 16 of the first space 10, which gas acts as a stop for outward spring action. The gas volume in the second cavity 16 of the first space 10 results in avoidance of negative pressure in the first cavity 14 containing the oil when the force/pressure from the gas volume in the second cavity 16 is about the size of the unsprung weight, i.e. the weight which, for example, is constituted by a tire, rim, brake disc, hub, etc.

FIGS. 6a-b schematically show a suspension device II according to the second embodiment during compression and expansion, and during heeling restrain, respectively.

FIG. 6a shows the function of the suspension device II during normal inward and outward spring action, respectively, i.e. during driving in which no heavy curves or inclinations occur, but only normal irregularities on the roadway exist. In this position, the controllable valve member 56 is in its open position. During compression/inward spring action the piston stem 12 is retracted whereby oil flows from the first cavity 14 through the first non-return valve 52 and further through the first throttle valve 53, whereby damping action is achieved, to the third cavity 24 of the second space 20, in which second space spring action is achieved by means of the nitrogen gas of high pressure. During expansion/outward spring action the piston stem 12 is extended whereby oil flows from the third cavity 24 through the second non-return valve 54 and further through the second throttle valve 55, whereby damping action is achieved, further through the controllable valve member 56, being in its open position, to the first cavity 14.

FIG. 6b shows the function of the suspension device II during heeling, i.e. during heavy cornering of the vehicle, during heavy inclination, etc., when the controllable valve member 56 is activated by means of a sensing means (not shown) arranged to sense the heeling. In this position, the controllable valve member 56 is in its closed position. During compression/inward spring action the piston stem 12 is retracted whereby oil flows from the first cavity 14 through the first non-return valve 52 and further through the first throttle valve 53, whereby damping action is achieved, to the third cavity 24 of the second space 20, in accordance with the function during normal inward spring action according to FIG. 6a. During expansion/outward spring action, oil is prevented from flowing through the controllable valve member 56, which has now been set to its closed position, whereby the piston stem 12 is not extended, but remains in its normal position.

The suspension device II according to the second embodiment thus has separate throttle valves (dampers) 55, 53 for inward and outward spring action, and non-return valves 54, 52 in each loop. The suspension device II constitutes a single-acting spring leg with oil in the first cavity 14 and gas in the second cavity 16 of the first space 10. The gas acts as a stop for outward spring action. The result of the gas volume in the second cavity 16 of the first space 10 is that negative pressure is avoided in the first cavity 14 which contains the oil when the force/pressure from the gas volume in the second cavity 16 is about the size of the unsprung weight, i.e. the weight which, for example, is constituted by a tire, rim, brake disc, callipers, etc.

Figure 7A:
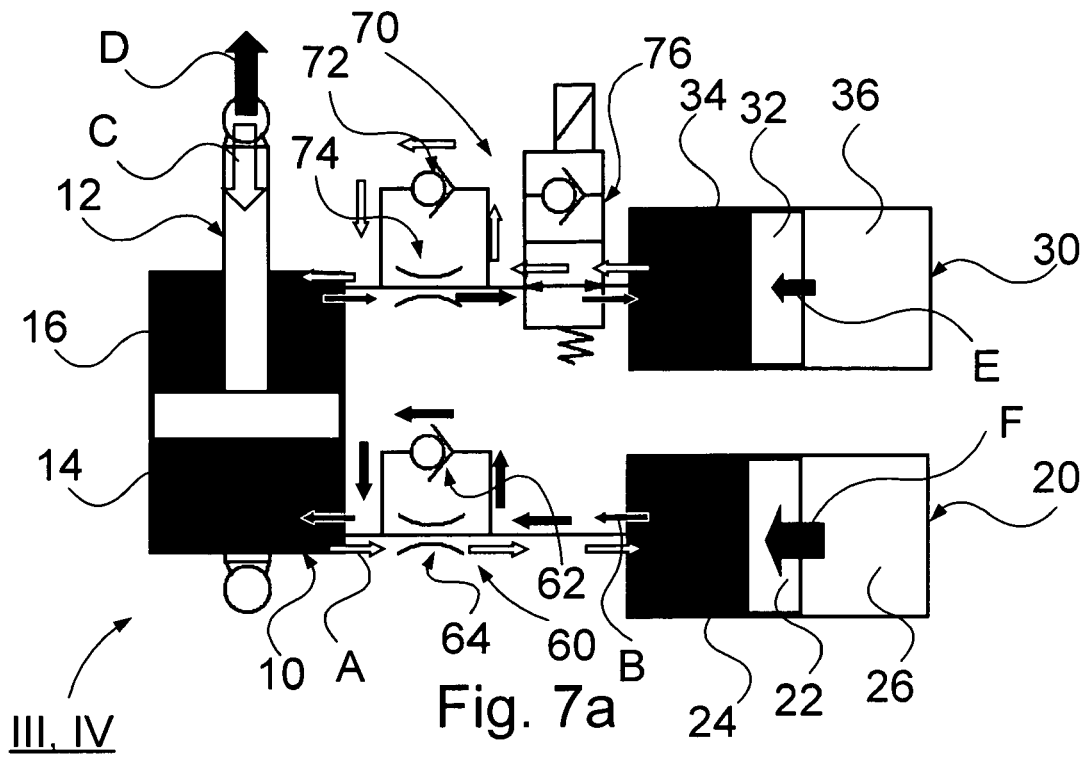
FIGS. 7a-b schematically show the suspension device according to the third/fourth embodiment during compression and expansion, and during heeling restrain respectively.
Figure 7B:
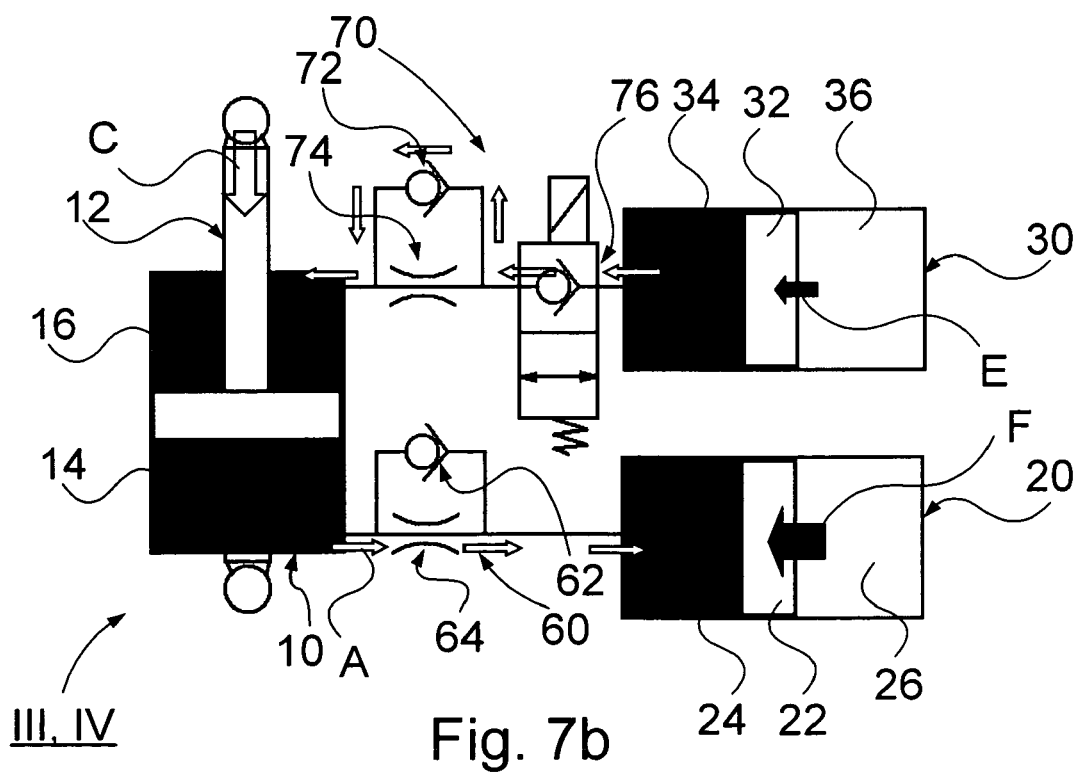

FIGS. 7a-b schematically show the suspension devices III and IV according to the third and fourth embodiments during compression and expansion, and heeling restraint, respectively.

FIG. 7a shows the function of the suspension device III or IV during normal inward and outward spring action, respectively, i.e. during driving in which no heavy curves or inclinations occur, but only normal irregularities on the roadway exist. In this position, the controllable valve member 76 is in its open position. During compression/inward spring action the piston stem 12 is retracted whereby oil flows from the first cavity 14 of the first space 10 through the first throttle valve 64 of the first valve configuration 60, whereby damping action is achieved, to the third cavity 24 of the second space 20, in which second space spring action is achieved by means of the nitrogen gas of high pressure in fourth cavity 26. When the piston stem 12 is retracted, oil flows from the fifth cavity 34 of the third space 30 through the second valve configuration 70, i.e. through the controllable valve member 76, being in its open position, and further through the second non-return valve 72, to the second cavity 16 of the first space 10.

During expansion/outward spring action the piston stem 12 is extended whereby oil flows from the third cavity 24 of the second space 20 through the first non-return valve 62 of the first valve configuration 60 to the first cavity 14. When the piston stem 12 is extended, oil also flows from the second cavity 16 of the first space 10 through the second throttle valve 74 and further through the controllable valve member 76, being in its open position, to the fifth cavity 34 of the third space 30.

FIG. 7b shows the function of the suspension device III or IV during heeling, i.e. during heavy cornering of the vehicle, during heavy inclination, etc., when the controllable valve member 76 is activated by means of sensing means arranged to sense the heeling. In this position, the controllable valve member 76 is in its closed position. During compression/inward spring action, the piston stem 12 is retracted whereby oil flows in accordance with normal inward spring action according to FIG. 7a above. During expansion/outward spring action, oil is prevented from flowing through the controllable valve member 76, which now is in its closed position, whereby the piston stem is not extended but remains in its normal position.

The suspension device III according to the third embodiment is a hydro-pneumatic suspension device, in which the second space 20, with gas having high pressure in the fourth cavity 26, constitutes a gas spring. The suspension device IV according to the fourth embodiment only constitutes a hydro-pneumatic damper, whereby a spring member may be used for spring action, in which the gas volume in the fourth cavity 26 in the second space 20 and the gas volume in the sixth cavity 36 in the third space 30 function as gas dampers, i.e. by pressurizing the oil, thereby avoiding cavitation of the same, or that the damping will not have too much play in the case of oil leakage.

The suspension devices III, IV according to third and fourth embodiments, respectively, each constitute a double-acting suspension device in which both the first cavity 14 and the second cavity 16 of the first space 10 contain oil. This minimizes the risk of cavitation, i.e. splitting and/or formation of foam in the oil is minimized.

Figure 8A:
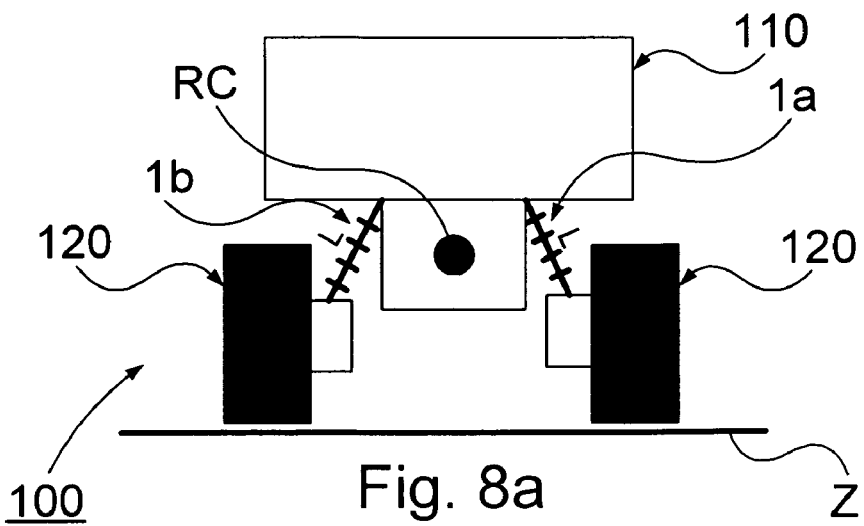
FIGS. 8a-c schematically show a vehicle in an unsprung state, in a sprung state according to prior art, and a sprung state according to the preset invention respectively.
Figure 8B:
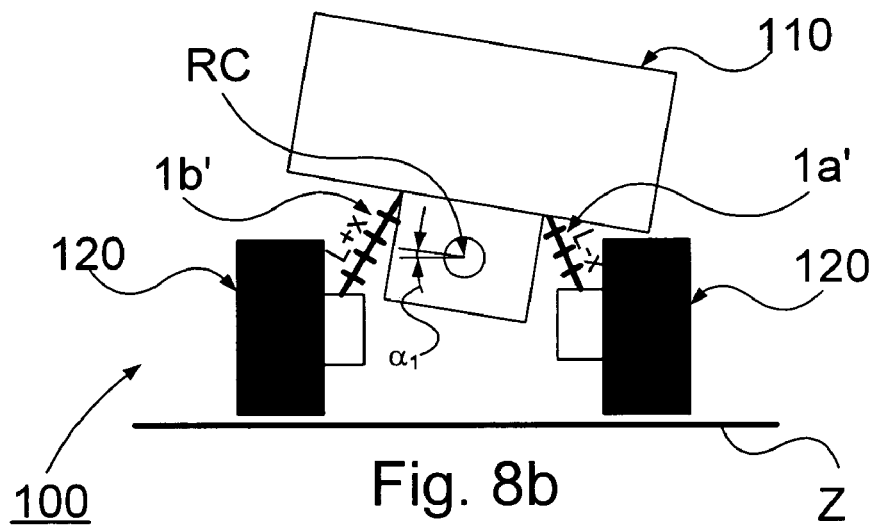
Figure 8C:
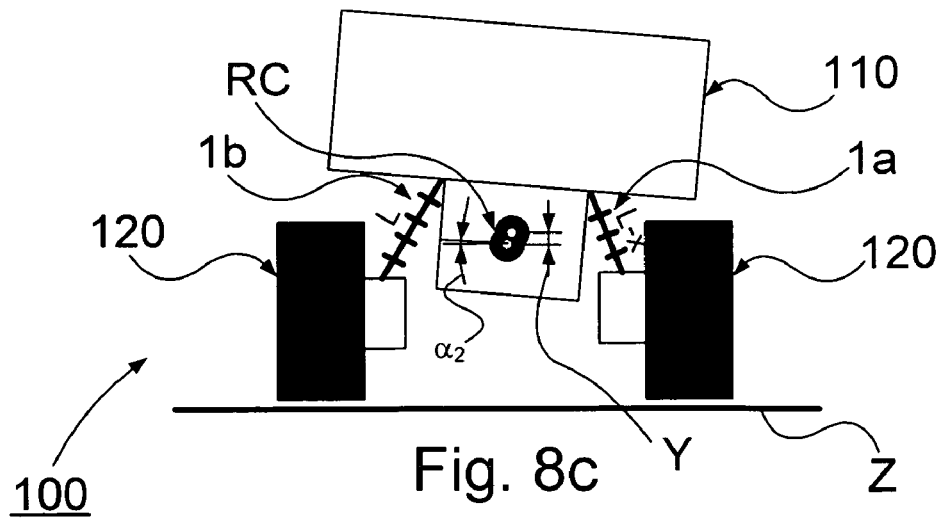

FIGS. 8a-c schematically show a vehicle in an unsprung condition, in a sprung condition according to the prior art, and in a sprung condition according to the present invention, respectively.

FIG. 8a schematically shows a vehicle 100 on a roadway Z in an unsprung state, the vehicle 100 comprising a vehicle body 110, wheels 120, and suspension devices 1a, 1b connected between each wheel and the vehicle according to any of the embodiments I-IV above, in the form of a spring leg. In the unsprung state, each spring leg 1a, 1b has the length L. The vehicle has a so-called roll centre RC about which the vehicle body rotates during heeling.

FIG. 8b schematically shows a vehicle 100 that lacks stabilizers on the roadway Z in a sprung state during heeling according to the prior art. The vehicle 100 comprises the vehicle body 110, the wheels 120, and suspension devices 1a', 1b' connected between each wheel and the vehicle body. During, for example, driving in a curve, heeling of the vehicle body occurs which rotates the vehicle body about its roll centre RC. In the case of the suspension device according to the prior art, the vehicle rolls during, for example, cornering, such that the outer suspension device 1a', i.e. the outer spring leg, of the vehicle is retracted to a length L-x, while the inner suspension device 1b', i.e. the inner spring leg, is extended to a length L+x, where x constitutes the retracted/extended length of either spring leg 1a', 1b'. The vehicle body 110 thus rotates heavily about the roll centre RC, with a roll angle $\alpha_1$.

The position of the centre of gravity during driving in a curve with a vehicle having conventional mechanical stabilizers will be raised in a hydro-pneumatic suspension device due to the great spring force in the suspension device, whereby the whole vehicle body will be raised.

The rotation of the vehicle body during driving in a curve will be reduced by conventional mechanical stabilizers due to the great spring force. The outer spring leg will get a very high spring constant which worsens the comfort and the grip of the wheel on an uneven ground.

FIG. 8c schematically shows a vehicle 100 on a roadway Z in a sprung condition during heeling with a suspension device according to the present invention. During heeling of the vehicle, the controllable valve member of the suspension device is arranged to be activated. In the case of suspension devices 1a, 1b according to the present invention, the vehicle is rolling during, for example, cornering, such that the outer suspension device 1a, i.e. the outer spring leg, of the vehicle is retracted to a length L-x, while the inner suspension device 1b, i.e. the inner spring leg, is not extended but maintains the length L, since the controllable valve member is activated and thus locks the inner suspension device 1b. More generally, the controllability of the damping and/or spring action comprises a locked or substantially locked state in the out-configuration. This leads to the achievement of a lower roll centre RC and a lower centre of gravity, where the roll centre RC/centre of gravity is lowered by Y, thus reducing rotation of the vehicle body, and thus causing a smaller angle $\alpha_2$.

The position of the centre of gravity of the vehicle will, during driving in a curve, be lowered with the controllable valve member activated in the locked position, whereby the whole of the vehicle body is lowered to a great extent, which heavily reduces the risk of tipping.

The rotation of the vehicle body during driving in a curve will, with the controllable valve member activated in the locked position, result in a lower angle of rotation $\alpha_2$, since the centre of gravity is lowered, and since the inner spring leg does not contribute to any rotation of the vehicle. The spring force in the outer spring leg only marginally increases, whereby comfort and grip is maintained.

Figure 9:
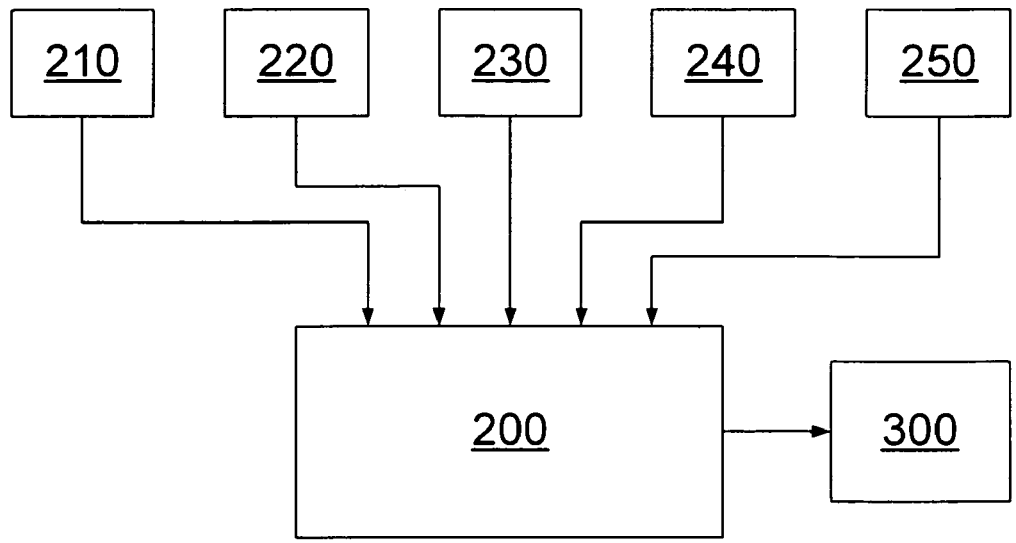
FIG. 9 schematically shows a control system for controlling the suspension device according to the present invention.

FIG. 9 schematically shows a system for controlling the suspension device according to the present invention. The control system comprises an electronic control unit 200, an accelerometer 210 arranged to sense the lateral acceleration of the vehicle, a roll angle sensor 220 arranged to sense the inclination of the vehicle about its roll centre, a speed sensor 230 arranged to sense the speed of the vehicle, a steering angle sensor 240 arranged to sense the steering angle of the vehicle, an inclination sensor 250 arranged to sense the inclination of the vehicle relative to the horizontal plane, and a controllable valve member 300, which may include any controllable valve member 44, 56, 76 according to the embodiments of the suspension devices I-IV. The inclination sensor 250 is according to a variant arranged to sense the position of the wheels in relation to the right or left side of the vehicle in order to determine whether the vehicle is inclining or not.

The electronic control unit 200 is connected to and arranged to receive information from the accelerometer 210, the roll angle sensor 220, the speed sensor 230, the steering angle sensor 240, and/or the inclination sensor 250. The electronic control unit 200 is connected to the controllable valve member 300, wherein the electronic control unit 200 is arranged to transfer information about lateral acceleration, roll angle, vehicle speed, and/or steering angle to the controllable valve member 300. The controllable valve member 300 is controllable between an active closed position and an inactive open position based on the information transferred from the electronic control unit 200.

The controllable valve member 300 of the suspension devices I-IV according to the first, second, third, and fourth embodiments, respectively, is arranged to be controlled by means of sensors arranged at each wheel of the vehicle, respectively, which, according to a variant, are arranged to determine the vertical position of each wheel and the amount of the force acting on each wheel. Accelerometers 210, for example, are arranged to transmit information to the electronic control unit 200 when the vehicle accelerates, brakes and turns. The electronic control unit 200 is arranged to regularly process information and determine the position of each wheel.

Figure 10:
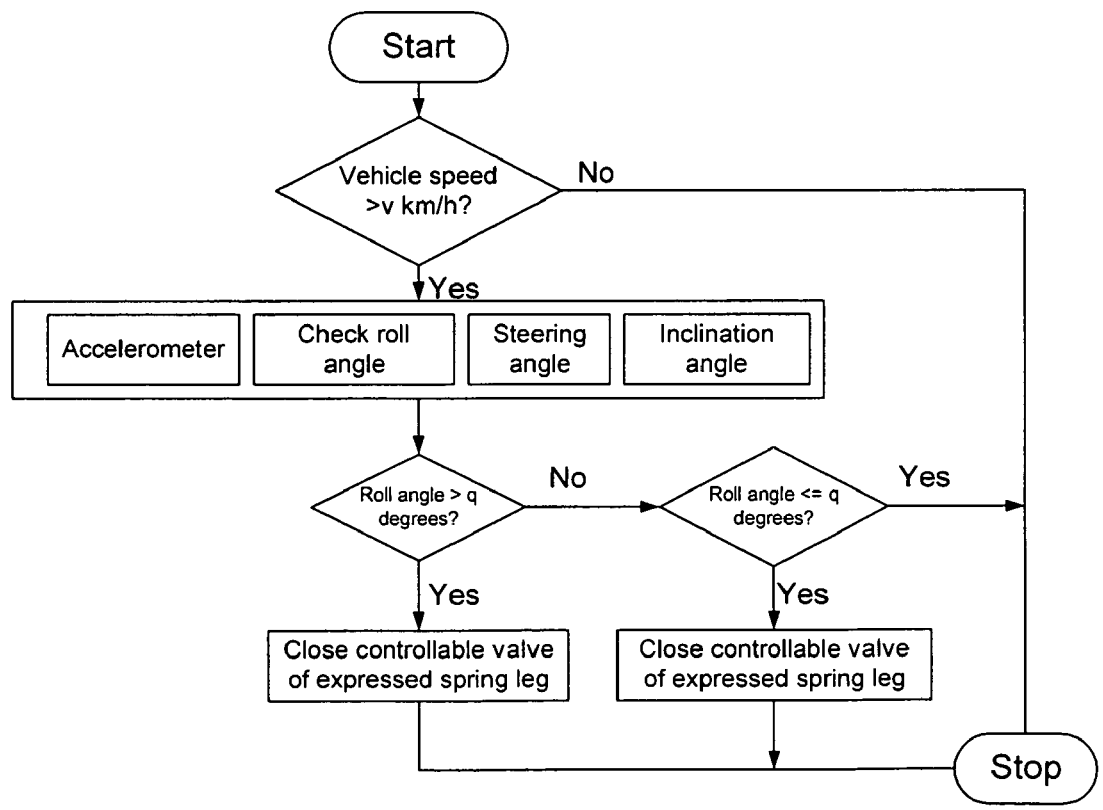
FIG. 10 schematically shows a flow chart for controlling the suspension device.

FIG. 10 schematically shows a flow chart for controlling the suspension device by means of a computer programme being initiated and controlled by the electronic control unit 200. Alternatively, the computer programme may be controlled by an external computer connected to the electronic control unit 200.

The electronic control unit 200 initiates the computer programme, which is run substantially continuously during driving of the vehicle. If the vehicle speed is less than v km/h, e.g. 20 km/h, the run is stopped, i.e. there is no activation of each controllable valve member. If the vehicle speed is greater than v km/h, the roll angle $\alpha$ is controlled. If the roll angle $\alpha$ is greater than q degrees, e.g. 3 degrees in either direction, the controllable valve member is activated such that it is locked in the suspension device on which expansion force is acting in the out-configuration, so that outward spring action/outward damping action is locked.

According to another embodiment of the present invention, the computer programme comprises a programme code for performing the step of locking or substantially locking the damping and/or spring action in the out-configuration, when the computer programme is executed on a computer.

According to another embodiment of the present invention, the computer programme comprises programme code for performing the step of sensing heeling of the vehicle during cornering, driving on uneven terrain, etc., in order to, based upon the heeling, lock or substantially lock the damping and/or spring action in the out-configuration, when the computer programme is executed on the computer.

According to another embodiment of the present invention, the computer programme comprises programme code in order to, based upon the lateral acceleration, lock or substantially lock the damping and/or spring action in the out-configuration, when the computer programme is executed on the computer.

According to another embodiment of the present invention, the computer programme comprises programme code for performing the step of sensing the inclination of the vehicle relative to the horizontal plane in order to, based on the inclination, lock or substantially lock the damping and/or spring action in the out-configuration, when the computer programme is executed on the computer.

According to another embodiment of the present invention, a computer programme product comprises programme code stored on a media, readable by a computer, for performing the step of locking or substantially locking the damping and/or spring action in the out-configuration, when the computer programme is executed on a computer.

According to another embodiment of the present invention, the computer programme product comprises programme code for performing the step of sensing heeling of the vehicle during cornering, driving on uneven terrain, etc., in order to, based upon the heeling, lock or substantially lock the damping and/or spring action in the out-configuration, when the computer programme is executed on the computer.

According to another embodiment of the present invention, the computer programme product comprises programme code stored on a media, readable by a computer, for performing the step of sensing lateral acceleration in order to, based upon the lateral acceleration, lock or substantially lock the damping and/or spring action in the out-configuration, when the computer programme is executed on the computer.

According to another embodiment of the present invention, the computer programme product comprises programme code stored on a media, readable by a computer, for performing the step of sensing the inclination of the vehicle relative to the horizontal plane in order to, based upon the inclination, lock or substantially lock the damping and/or spring action in the out-configuration, when the computer programme is executed on the computer.

According to another embodiment, the present invention comprises a computer programme product directly loadable into an internal memory of a computer for performing the step of locking or substantially locking the damping and/or spring action in the out-configuration, when the computer programme is executed on the computer.

According to another embodiment, the present invention comprises a computer programme product directly loadable into an internal memory of a computer for performing the step of sensing heeling of the vehicle during cornering, driving on uneven terrain, etc., in order to, based upon the heeling, lock or substantially lock the damping and/or spring action in the out-configuration, when the computer programme is executed on the computer.

According to another embodiment, the present invention comprises a computer programme product directly loadable into an internal memory of a computer for performing the step of sensing lateral acceleration in order to, based upon the lateral acceleration, lock or substantially lock the damping and/or spring action in the out-configuration, when the computer programme is executed on the computer.

According to another embodiment, the present invention comprises a computer programme product directly loadable into an internal memory of a computer for performing the step of sensing the inclination of the vehicle relative to the horizontal plane in order to, based upon the inclination, lock or substantially lock the damping and/or spring action in the out-configuration, when the computer programme is executed on a computer.

An advantage of the suspension device according to the present invention is that in heavy vehicles, such as cross-country military vehicles, the unsprung weight per wheel station of the vehicle is used as a ballast for preventing roll and kneeling of the vehicle. The weight of the wheel stations reduces the risk that the wheel stations will be lifted during overly heavy cornering.

The embodiments of the suspension device according to the present invention constitute so-called semi-active suspension devices. Also, so-called active suspension devices are conceivable, i.e. suspension devices in which both spring action and damping action are controllable, whereby, for example, harder spring would be achievable in the outer wheels during cornering while, at the same time, the outward damping action of the inner wheels is locked, which would further improve the running characteristics, i.e. reduce roll. By having an extra accumulator with gas which is connected to an accumulator of the spring leg, which works as a spring, i.e. a hydro-pneumatic system, more gas from the additional accumulator may temporarily be pressed into the gas volume of the spring leg whereby a firmer spring is achieved. This is conceivable during cornering or when the vehicle starts to incline to a large extent. With such an active system, locking of both outward spring action and outward damping action results in backup, i.e. if one fails the other will provide locking during, for example, cornering.

As described above, both expansion and compression of the suspension device according to the different embodiments of the present invention have been achieved through a piston stem. Alternatively, expansion and compression of the suspension device according to the present invention may be achieved by means of a membrane device.

Although only hydro-pneumatic dampers have been mentioned, electric dampers or magnetic dampers are also within the scope of the present invention.

By vehicle is intended not only any kind of motor vehicle, such as a car, truck, military vehicle such as crawler-type vehicle, wheeled vehicle, or cross-country vehicle, but also non-motor driven vehicles such as tows, wagons, etc.

The invention should not be considered to be limited by the above-mentioned embodiments, but may be varied within the scope of the appended claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A suspension device having in- and out-configurations for use with a vehicle, the suspension device comprising:
   means for providing damping and/or spring action operable in a direction of compression and a direction of expansion, the damping and/or spring action being controllable to have at least a substantially locked state in the out-configuration in which the means for providing damping and/or spring action is operable in only one of the direction of compression or the direction of expansion.

2. The suspension device of claim 1, wherein the damping action is arranged to occupy the at least substantially locked state in the out-configuration such that the suspension device is semi-active.

3. The suspension device of claim 1, wherein the damping action is hydraulic.

4. The suspension device of claim 3, further comprising a valve configuration including a first valve for control in the out-configuration.

5. The suspension device of claim 4, wherein the valve configuration further includes a separate valve in the in-configuration.

6. The suspension device of claim 4, wherein the valve configuration further includes a throttle valve arranged in series with the first valve.

7. The suspension device of claim 1, further comprising at least one sensor for sensing the heeling of the vehicle, whereby the damping and/or spring action is arranged to be substantially locked in the out-configuration in response to the heeling.

8. The suspension device of claim 7, wherein the at least one sensor includes a member for sensing the lateral acceleration of the vehicle.

9. The suspension device of claim 7, wherein the at least one sensor includes a member for sensing the inclination of the vehicle relative to the horizontal plane of the vehicle.

10. A method of using a suspension device having in- and out-configurations for use with a vehicle, the method comprising:
providing damping and/or spring action to the vehicle, the damping and/or spring action being operable in a direction of compression and a direction of expansion; and
controlling the damping and/or spring action by at least substantially locking the damping and/or spring action in the out-configuration such that the damping and/or spring action is operable in only one of the direction of compression or the direction of expansion.

11. The method of claim 10, further comprising:
sensing the heeling of the vehicle; and
at least substantially locking the damping and/or spring action in the out-configuration in response to the heeling.

12. The method of claim 10, further comprising:
sensing the lateral acceleration of the vehicle; and
at least substantially locking the damping and/or spring action in the out-configuration in response to the lateral acceleration.

13. The method of claim 10, further comprising:
sensing the inclination of the vehicle relative to the horizontal plane of the vehicle; and
at least substantially locking the damping and/or spring action in the out configuration in response to the inclination.

14. A vehicle including the suspension device of claim 1.

15. A computer program comprising a program code for performing the method of claim 10.

16. A recording medium recorded with a computer program readable by a computer, the computer program including a program code for performing the method of claim 10.

17. The method of claim 10, wherein the controlling and locking steps are performed using a computer program including a program code.

18. A suspension device for use with a vehicle, the suspension device comprising:
a body movable in a retraction direction and in an extension direction; and
a valve mechanism having first and second conditions, the valve mechanism in the first condition permitting movement of the body in both the retraction direction and the extension direction, and the valve mechanism in the second condition permitting movement of the body in the retraction direction and substantially preventing movement of the body in the extension direction.

19. A method of controlling the suspension of a vehicle, the method comprising:
providing the vehicle with a suspension device having a body movable in a retraction direction and in an extension direction;
sensing a condition of the vehicle;
controlling the suspension device to permit movement of the body in both the retraction direction and the extension direction when the condition of the vehicle is a first condition; and
controlling the suspension device to permit movement of the body in the retraction direction while substantially preventing movement of the body in the extension direction when the condition of the vehicle is a second condition different from the first condition.

* * * * *